United States Patent
Horii et al.

(10) Patent No.: US 10,730,989 B2
(45) Date of Patent: Aug. 4, 2020

(54) METHOD FOR PRODUCING (METH)ACRYLAMIDE PAPERMAKING ADDITIVE AND (METH)ACRYLAMIDE POLYMER PAPERMAKING ADDITIVE

(71) Applicant: Harima Chemicals, Incorporated, Kakogawa-shi, Hyogo (JP)

(72) Inventors: Tadaaki Horii, Kakogawa (JP); Hirotaka Sato, Kakogawa (JP); Takanori Kurihara, Kakogawa (JP); Takahiro Fujiwara, Kakogawa (JP); Kazushige Inaoka, Kakogawa (JP)

(73) Assignee: HARIMA CHEMICALS, INCORPORATED, Kakogawa-Shi, Hyogo (JP)

( * ) Notice: Subject to any disclaimer, the term of this patent is extended or adjusted under 35 U.S.C. 154(b) by 0 days.

(21) Appl. No.: 16/625,012

(22) PCT Filed: Apr. 27, 2018

(86) PCT No.: PCT/JP2018/017171
§ 371 (c)(1),
(2) Date: Dec. 20, 2019

(87) PCT Pub. No.: WO2019/003625
PCT Pub. Date: Jan. 3, 2019

(65) Prior Publication Data
US 2020/0140596 A1    May 7, 2020

(30) Foreign Application Priority Data

Jun. 28, 2017  (JP) .................................. 2017-125961

(51) Int. Cl.
| | | |
|---|---|---|
| C08F 267/10 | (2006.01) | |
| C08F 228/02 | (2006.01) | |
| C08F 220/56 | (2006.01) | |
| D21H 17/37 | (2006.01) | |

(52) U.S. Cl.
CPC .......... *C08F 267/10* (2013.01); *C08F 220/56* (2013.01); *C08F 228/02* (2013.01); *D21H 17/375* (2013.01)

(58) Field of Classification Search
CPC ......... C08F 2/00; C08F 220/56; C08F 228/02
See application file for complete search history.

(56) References Cited

U.S. PATENT DOCUMENTS

| | | | |
|---|---|---|---|
| 9,995,001 | B2 | 6/2018 | Sato et al. |
| 2006/0249269 | A1 | 11/2006 | Kurian et al. |
| 2016/0340831 | A1 | 11/2016 | Sato et al. |
| 2018/0163346 | A1 | 6/2018 | Sato et al. |

FOREIGN PATENT DOCUMENTS

| | | |
|---|---|---|
| CN | 101062963 A | 10/2007 |
| CN | 104343052 A | 2/2015 |
| CN | 105980428 A | 9/2016 |
| JP | H06199965 A | 7/1994 |
| JP | 2004224998 A | 8/2004 |
| JP | 2008179910 A | 8/2008 |
| JP | 2011246830 A | 12/2011 |
| JP | 2012-251252 A | 12/2012 |
| JP | 2015052194 A | 3/2015 |
| JP | 6060314 B2 | 12/2016 |
| WO | 02053835 A1 | 7/2002 |
| WO | 2006118875 A2 | 11/2006 |
| WO | 2016092965 A1 | 6/2016 |

OTHER PUBLICATIONS

International Search Report (with English Translation) and Written Opinion issued in corresponding International Patent Application No. PCT/JP2018/017171, 8 pages (dated Jun. 19, 2018).

International Preliminary Report on Patentability and an English translation thereof (Forms PCT/IB/373, and PCT/ISA/237) dated Jan. 9, 2020, by the International Bureau of WIPO in corresponding International Patent Application PCT/JP2018/017171 (9 pages).

*Primary Examiner* — Jeffrey C Mullis
(74) *Attorney, Agent, or Firm* — Buchanan Ingersoll & Rooney PC

(57) ABSTRACT

In a method for producing a (meth)acrylamide polymer papermaking additive obtaining a (meth)acrylamide polymer by obtaining a first polymer by polymerizing a first polymerization component containing a (meth)acrylamide and polymerizing a second polymerization component containing a tertiary amino monomer under the presence of the first polymer, the first polymerization component and/or the second polymerization component contain(s) a (meth)allyl sulfonate, a ratio of the tertiary amino monomer in the first polymerization component with respect to 100 mol of the (meth)acrylamide in the first polymerization component is 0.1 mol or less, and a ratio of the (meth)acrylamide in the second polymerization component with respect to 100 mol of the tertiary amino monomer in the second polymerization component is 1.0 mol or less.

10 Claims, No Drawings

METHOD FOR PRODUCING (METH)ACRYLAMIDE PAPERMAKING ADDITIVE AND (METH)ACRYLAMIDE POLYMER PAPERMAKING ADDITIVE

TECHNICAL FIELD

The present invention relates to a method for producing a (meth)acrylamide polymer papermaking additive and a (meth)acrylamide polymer papermaking additive.

BACKGROUND ART

In the papermaking field, for example, various papermaking chemicals such as retention aids and drainage aids so as to improve the runnability and work efficiency by improving the yield and water filtering property of pulp and/or fillers which are/is a raw material, and paper strengthening agents so as to improve the strength of paper products have been conventionally known.

As such a papermaking chemical, a paper strengthening agent made of an aqueous solution of a (meth)acrylamide polymer has been known, and to be specific, for example, it has been proposed that a (meth)acrylamide, a dimethylaminoethyl methacrylate, a quaternary compound of a dimethylaminoethyl methacrylate, an itaconic acid, a sodium methallylsulfonate, a methylene bisacrylamide (polyfunctional vinyl monomer), and deionized water are charged, and a polymerization initiator (ammonium persulfate) is added thereto to be reacted, so that the paper strengthening agent is obtained as an aqueous solution of an amphoteric polyacrylamide (ref: Patent Document 1).

CITATION LIST

Patent Document

Patent Document 1: Japanese Unexamined Patent Publication No. 2008-179910

SUMMARY OF THE INVENTION

Problem to be Solved by the Invention

Meanwhile, when the paper strengthening agent described in Patent Document 1 is used, a (meth)acrylamide may be contained in a paper product to be obtained. The (meth)acrylamide is not preferable for the human body, and is subject to regulation in the United States Food and Drug Administration (FDA) or the like. Thus, for example, when the paper product is used for food packaging or the like, a reduction of the (meth)acrylamide content in the paper product is demanded.

The present invention provides a method for producing a (meth)acrylamide polymer papermaking additive for producing a (meth)acrylamide polymer papermaking additive that is capable of retaining properties as a papermaking additive and reducing the (meth)acrylamide content in paper, and a (meth)acrylamide polymer papermaking additive obtained by the method.

Means for Solving the Problem

The present invention [1] includes a method for producing a (meth)acrylamide polymer papermaking additive by polymerizing a polymerization component containing a (meth)acrylamide, a tertiary amino monomer, and a (meth)allyl sulfonate, the method including a first polymerization step of obtaining a first polymer by polymerizing a first polymerization component containing the (meth)acrylamide and a second polymerization step of obtaining a (meth)acrylamide polymer by polymerizing a second polymerization component containing the tertiary amino monomer under the presence of the first polymer obtained in the first polymerization step, wherein the first polymerization component and/or the second polymerization component contain(s) the (meth)allyl sulfonate, a ratio of the tertiary amino monomer in the first polymerization component with respect to 100 mol of the (meth)acrylamide in the first polymerization component is 0.1 mol or less, and a ratio of the (meth)acrylamide in the second polymerization component with respect to 100 mol of the tertiary amino monomer in the second polymerization component is 1.0 mol or less.

The present invention [2] includes the method for producing a (meth)acrylamide polymer papermaking additive described in the above-described [1], wherein the first polymerization component does not contain the tertiary amino monomer.

The present invention [3] includes the method for producing a (meth)acrylamide polymer papermaking additive described in the above-described [1] or [2], wherein the second polymerization component does not contain the (meth)acrylamide.

The present invention [4] includes the method for producing a (meth)acrylamide polymer papermaking additive described in any one of the above-described [1] to [3], wherein the first polymerization component and/or the second polymerization component contain(s) a quaternary ammonium monomer.

The present invention [5] includes the method for producing a (meth)acrylamide polymer papermaking additive described in any one of the above-described [1] to [4], wherein the first polymerization component and/or the second polymerization component contain(s) an anionic polymerizable monomer.

The present invention [6] includes the method for producing a (meth)acrylamide polymer papermaking additive described in any one of the above-described [1] to [5], wherein the first polymerization component and/or the second polymerization component contain(s) a cross-linking monomer containing nitrogen, and a ratio of the cross-linking monomer containing nitrogen in the first polymerization component with respect to 100 mol of the (meth)acrylamide in the first polymerization component is 0.1 mol or less.

The present invention [7] includes the method for producing a (meth)acrylamide polymer papermaking additive described in the above-described [6], wherein the second polymerization component contains a cross-linking monomer containing nitrogen.

The present invention [8] includes the method for producing a (meth)acrylamide polymer papermaking additive described in any one of the above-described [1] to [7], wherein the first polymerization component and/or the second polymerization component further contain(s) another polymerizable monomer.

The present invention [9] includes the method for producing a (meth)acrylamide polymer papermaking additive described in any one of the above-described [1] to [8], wherein in the first polymerization step and/or the second polymerization step, the polymerization component is subjected to a multi-step polymerization.

The present invention [10] includes a (meth)acrylamide polymer papermaking additive obtained by polymerizing a polymerization component containing a (meth)acrylamide, a tertiary amino monomer, and a (meth)allyl sulfonate and obtained by first obtaining a first polymer by polymerizing a first polymerization component containing the (meth) acrylamide and then, polymerizing a second polymerization component containing the tertiary amino monomer under the presence of the first polymer, wherein the first polymerization component and/or the second polymerization component contain(s) the (meth)allyl sulfonate, a ratio of the tertiary amino monomer in the first polymerization component with respect to 100 mol of the (meth)acrylamide in the first polymerization component is 0.1 mol or less, and a ratio of the (meth)acrylamide in the second polymerization component with respect to 100 mol of the tertiary amino monomer in the second polymerization component is 1.0 mol or less.

Effect of the Invention

According to the method for producing a (meth)acrylamide polymer papermaking additive of the present invention, in the case of the use for the production of paper, a (meth)acrylamide polymer papermaking additive that is capable of retaining properties as a papermaking additive and reducing the (meth)acrylamide content in a paper product to be obtained can be excellently produced.

According to the (meth)acrylamide polymer papermaking additive of the present invention, in the case of the use for the production of paper, the properties as the papermaking additive are capable of being retained and the (meth)acrylamide content in the paper product to be obtained is capable of being reduced.

DESCRIPTION OF EMBODIMENTS

In a method for producing a (meth)acrylamide polymer papermaking additive of the present invention, a polymerization component containing a (meth)acrylamide, a tertiary amino monomer, and a (meth)allyl sulfonate is polymerized, so that a (meth)acrylamide polymer is produced. That is, the (meth)acrylamide polymer is a polymer of the polymerization component containing the (meth)acrylamide, the tertiary amino monomer, and the (meth)allyl sulfonate.

Although the details are described later, in this method, first, a portion (first polymerization component) of the polymerization component is polymerized, and thereafter, a remaining portion (second polymerization component) of the polymerization component is polymerized, so that the (meth)acrylamide polymer is produced.

In the polymerization component, examples of the (meth) acrylamide include acrylamide and methacrylamide. The (meth)acryl is defined as acryl and/or methacryl (hereinafter, the same).

These (meth)acrylamides can be used alone or in combination of two or more. That is, only one of the acrylamide and the methacrylamide may be used, or they may be used in combination. Preferably, the acrylamide is used alone.

A content ratio of the (meth)acrylamide with respect to the total mol of the polymerization component is, for example, 50 mol % or more, preferably 60 mol % or more, and for example, 99 mol % or less, preferably 97 mol % or less.

The tertiary amino monomer is a polymerizable monomer having a tertiary amino group (non-quaternary compound), and examples thereof include (meth)acrylate derivatives having a tertiary amino group and (meth)acrylamide derivatives having a tertiary amino group.

Examples of the (meth)acrylate derivative having a tertiary amino group include dialkylaminoethyl (meth)acrylate (for example, dimethylaminoethyl (meth)acrylate or the like) and dialkylaminopropyl (meth)acrylate. An example of the (meth)acrylamide derivative having a tertiary amino group includes dialkylaminoalkyl (meth)acrylamide (for example, dialkylaminopropyl (meth)acrylamide (for example, dimethylaminopropyl acrylamide or the like), (meth)acrylamide-3-methylbutyldimethylamine, or the like).

These tertiary amino monomers can be used alone or in combination of two or more.

As the tertiary amino monomer, preferably, dialkylaminoethyl (meth)acrylate and dialkylaminoalkyl (meth)acrylamide are used, more preferably, dimethylaminoethyl (meth)acrylate and dimethylaminopropyl acrylamide are used.

The content ratio of the tertiary amino monomer with respect to the total mol of the polymerization component is, for example, 0.01 mol % or more, preferably 0.1 mol % or more, and for example, 15 mol % or less, preferably 10 mol % or less.

The (meth)allyl sulfonate is a copolymerizable monomer that also functions as a chain transfer agent. (Meth)allyl is defined as allyl and/or methallyl.

To be specific, examples of the (meth)allyl sulfonate include sodium allylsulfonate, sodium methallylsulfonate, potassium allylsulfonate, and potassium methallylsulfonate.

These (meth)allyl sulfonates can be used alone or in combination of two or more.

As the (meth)allyl sulfonate, preferably, sodium methallylsulfonate is used.

The content ratio of the (meth)allyl sulfonate with respect to the total mol of the polymerization component is, for example, 0.01 mol % or more, preferably 0.2 mol % or more, and for example, 5 mol % or less, preferably 3 mol % or less.

The polymerization component can also contain a quaternary ammonium monomer as an optional component.

The quaternary ammonium monomer is a cationic copolymerizable monomer having a quaternary ammonium group and having an ethylenically double bond, and examples thereof include a quaternary compound that is obtained by quaternizing a tertiary amino group of a polymerizable monomer having a tertiary amino group (hereinafter, referred to as a quaternary compound of the tertiary amino monomer) and a quaternary compound that is obtained by quaternizing a tertiary amino group of a diallylamine derivative monomer (hereinafter, referred to as a quaternary compound of the diallylamine derivative monomer).

An example of the quaternary compound of the tertiary amino monomer includes a quaternary compound (quaternary salt) obtained by quaternizing the tertiary amino group of the above-described tertiary amino monomer (polymerizable monomer having a tertiary amino group) with methyl chloride (chloromethane), methyl bromide, benzyl chloride, benzyl bromide, dimethyl sulfate, epichlorohydrin, or the like.

Examples of the quaternary compound of the diallylamine derivative monomer include diallyldimethylammonium chloride, diallyldimethylammonium bromide, diallyldiethylammonium chloride, diallyldibutylammonium chloride, and diallylmethylethylammonium chloride.

These quaternary ammonium monomers can be used alone or in combination of two or more.

As the quaternary ammonium monomer, preferably, a quaternary compound of a dialkylaminoalkyl (meth)acrylamide and a quaternary compound of a diallylamine derivative monomer are used, more preferably, a quaternary compound of a diallylamine derivative monomer is used.

As the quaternary compound of the dialkylaminoalkyl (meth)acrylamide, preferably, a quaternary compound of a dimethylaminopropyl acrylamide is used. Preferably, a quaternary compound of a methyl chloride (chloromethane) or a benzyl chloride is used.

As the quaternary compound of the diallylamine derivative monomer, preferably, a diallyldimethylammonium chloride is used.

When the polymerization component contains the quaternary ammonium monomer, the content ratio thereof with respect to the total mol of the polymerization component is, for example, 0.01 mol % or more, preferably 0.1 mol % or more, and for example, 50 mol % or less, preferably 40 mol % or less, more preferably 30 mol % or less, further more preferably 15 mol % or less.

The polymerization component can also contain an anionic polymerizable monomer as an optional component.

Examples of the anionic polymerizable monomer include organic acid monomers such as $\alpha,\beta$-unsaturated carboxylic acid and sulfonic acid monomer having a vinyl group.

Examples of the $\alpha,\beta$-unsaturated carboxylic acid include $\alpha,\beta$-unsaturated monocarboxylic acid monomers such as acrylic acid, methacrylic acid, and crotonic acid and $\alpha,\beta$-unsaturated dicarboxylic acid monomers such as maleic acid, fumaric acid, itaconic acid, and citraconic acid.

Examples of the sulfonic acid monomer having a vinyl group include vinyl sulfonic acid, styrene sulfonic acid, and 2-acrylamide-2-methylpropane sulfonic acid.

As the anionic copolymerizable monomer, salts such as sodium salt, potassium salt, and ammonium salt of the above-described organic acid monomer can be also used.

These anionic polymerizable monomers can be used alone or in combination of two or more.

As the anionic polymerizable monomer, preferably, an organic acid monomer is used, more preferably, an $\alpha,\beta$-unsaturated carboxylic acid is used, further more preferably, an itaconic acid and an acrylic acid are used.

When the polymerization component contains the anionic polymerizable monomer, the content ratio thereof with respect to the total mol of the polymerization component is, for example, 0.1 mol % or more, preferably 0.5 mol % or more, and for example, 20 mol % or less, preferably 10 mol % or less.

When the polymerization component contains the anionic polymerizable monomer, in a case where the (meth)acrylamide polymer obtained from the polymerization component is used in the production of paper, the paper strength can be more excellently increased, and the (meth)acrylamide content in the paper product can be reduced.

The polymerization component can also contain a cross-linking monomer containing nitrogen as an optional component.

The cross-linking monomer containing nitrogen is a cross-linking monomer containing one or more nitrogen atoms in one molecule, and examples thereof include a cross-linking monomer having an amide group and a cross-linking monomer having an imide group.

Examples of the cross-linking monomer having an amide group include methylenebis (meth)acrylamide, ethylenebis (meth)acrylamide, allyl (meth)acrylamide, N-substituted acrylamide monomer (for example, N,N'-dimethylacrylamide, diacetone acrylamide, and isopropyl acrylamide), and triacrylformal.

An example of the cross-linking monomer having an imide group includes diacryloylimide.

These cross-linking monomers containing nitrogen can be used alone or in combination of two or more.

When the polymerization component contains the cross-linking monomer containing nitrogen, the content ratio thereof with respect to the total mol of the polymerization component is, for example, 0.01 mol % or more, preferably 0.02 mol % or more, more preferably 0.1 mol % or more, further more preferably 0.5 mol % or more, and for example, 20 mol % or less, preferably 10 mol % or less, more preferably 5 mol % or less, further more preferably 1 mol % or less.

The polymerization component can also contain another polymerizable monomer (polymerizable monomer excluding the (meth)acrylamide, the tertiary amino monomer, the (meth)allyl sulfonate, the quaternary ammonium monomer, the anionic polymerizable monomer, and the cross-linking monomer containing nitrogen) as an optional component.

An example of the other polymerizable monomer includes a nonionic copolymerizable monomer.

Examples of the nonionic copolymerizable monomer include alkyl (meth)acrylate, hydroxyalkyl (meth)acrylate, diacetone acrylamide, styrene, $\alpha$-methylstyrene, polyalkylene glycol (meth)acrylate, glycerol mono(meth)acrylate, vinylpyrrolidone, vinyloxazoline, vinyl acetate, acryloyl morpholine, and acrylonitrile. Preferably, alkyl (meth)acrylate and hydroxyalkyl (meth)acrylate are used.

An example of the alkyl (meth)acrylate includes a (meth)acrylate monomer of a straight-chain, branched, or cyclic alkyl group having 1 to 30 carbon atoms such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, neopentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, dodecyl (meth)acrylate, tridecyl (meth)acrylate, tetradecyl (meth)acrylate, 1-methyltridecyl (meth)acrylate, hexadecyl (meth)acrylate, octadecyl (meth)acrylate (stearyl (meth)acrylate), isostearyl (meth)acrylate, eicosyl (meth)acrylate, docosyl (meth)acrylate (behenyl (meth)acrylate), tetracosyl (meth)acrylate, triacontyl (meth)acrylate, and cyclohexyl (meth)acrylate.

Examples of the hydroxyalkyl (meth)acrylate include 2-hydroxyethyl (meth)acrylate and 2-hydroxypropyl (meth)acrylate.

When the polymerization component contains the nonionic copolylmerizable monomer, the content ratio thereof with respect to the total mol of the polymerization component is, for example, 0.1 mol % or more, preferably 1 mol % or more, and for example, 20 mol % or less, preferably 10 mol % or less.

Furthermore, an example of the other copolymerizable monomer includes a cross-linking monomer without containing nitrogen.

The cross-linking monomer without containing nitrogen is a cross-linking monomer without containing a nitrogen atom in one molecule, and an example thereof includes a cross-linking monomer without containing an amide group and an imide group.

To be more specific, examples of the cross-linking monomer without containing nitrogen include a bifunctional cross-linking agent without containing nitrogen (for example, divinylbenzene, ethyleneglycol di(meth)acrylate, diethyleneglycol di(meth)acrylate, triethyleneglycol di(meth)acrylate, allyl (meth)acrylate, or the like) and a polyfunctional cross-linking agent without containing nitrogen (for example, pentaerythritol triacrylate, trimethylolpropane acrylate, tetraallyloxy ethane, or the like).

These cross-linking monomers without containing nitrogen can be used alone or in combination of two or more.

When the polymerization component contains the cross-linking monomer without containing nitrogen, the content ratio thereof with respect to the total mol of the polymerization component is, for example, 0.001 mol % or more, preferably 0.01 mol % or more, and for example, 10 mol % or less, preferably 5 mol % or less.

These other polymerizable monomers can be used alone or in combination of two or more.

When the polymerization component contains the other polymerizable monomer, in a case where the (meth)acrylamide polymer obtained from the polymerization component is used in the production of paper, the paper strength can be more excellently increased, and the (meth)acrylamide content in the paper product can be reduced.

The polymerization component preferably contains the (meth)acrylamide, the tertiary amino monomer, and the (meth)allyl sulfonate, and furthermore, contains at least one selected from the group consisting of quaternary ammonium monomer, anionic polymerizable monomer, cross-linking monomer containing nitrogen, and another polymerizable monomer (preferably, alkyl (meth)acrylate).

More preferably, examples of the polymerization component include a polymerization component consisting of the (meth)acrylamide, the tertiary amino monomer, and the (meth)allyl sulfonate, a polymerization component consisting of the (meth)acrylamide, the tertiary amino monomer, the (meth)allyl sulfonate, and the quaternary ammonium monomer, a polymerization component consisting of the (meth)acrylamide, the tertiary amino monomer, the (meth)allyl sulfonate, and the anionic polymerizable monomer, and a polymerization component consisting of the (meth)acrylamide, the tertiary amino monomer, the (meth)allyl sulfonate, the quaternary ammonium monomer, and the anionic polymerizable monomer.

In the method for producing a (meth)acrylamide polymer papermaking additive, the above-described polymerization component is first divided into a first polymerization component containing a (meth)acrylamide (portion of the polymerization component) and a second polymerization component containing a tertiary amino monomer (remaining portion of the polymerization component).

The ratio of the first polymerization component with respect to the total amount of the polymerization component (the total amount of the first polymerization component and the second polymerization component) is, for example, 1 mol % or more, preferably 3 mol % or more, and for example, 99.5 mol % or less, preferably 99 mol % or less.

The ratio of the second polymerization component with respect to the total amount of the polymerization component (the total amount of the first polymerization component and the second polymerization component) is, for example, 0.5 mol % or more, preferably 1 mol % or more, and for example, 99 mol % or less, preferably 97 mol % or less, more preferably 50 mol % or less, further more preferably 30 mol % or less.

The first polymerization component contains the (meth)acrylamide as an essential component.

In the first polymerization component, the content ratio of the (meth)acrylamide with respect to the total amount of the first polymerization component is, for example, 1 mol % or more, preferably 3 mol % or more, and for example, 100 mol % or less, preferably 99.5 mol % or less, more preferably 99 mol % or less.

The first polymerization component does not contain the tertiary amino monomer, or the tertiary amino monomer content in the first polymerization component is subtle.

In view of reduction of the (meth)acrylamide content in the paper product, the tertiary amino monomer content in the first polymerization component with respect to 100 mol of the (meth)acrylamide in the first polymerization component is, for example, 0.1 mol or less, preferably 0.01 mol or less, more preferably 0 mol.

That is, the first polymerization component preferably does not contain the tertiary amino monomer. In the following, the formulation in which the first polymerization component does not contain the tertiary amino monomer is described.

The second polymerization component is a remaining portion obtained by removing the above-described first polymerization component from the polymerization component, and contains the tertiary amino monomer as an essential component.

In the second polymerization component, the content ratio of the tertiary amino monomer with respect to the total amount of the second polymerization component is, for example, 0.5 mol % or more, preferably 0.1 mol % or more, and for example, 100 mol % or less, preferably 95 mol % or less, more preferably 90 mol % or less.

The second polymerization component does not contain the (meth)acrylamide, or the (meth)acrylamide content in the second polymerization component is subtle.

In view of reduction of the (meth)acrylamide content in the paper product, the (meth)acrylamide content in the second polymerization component with respect to 100 mol of the tertiary amino monomer in the second polymerization component is, for example, 1.0 mol or less, preferably 0.1 mol or less, more preferably 0 mol.

That is, the second polymerization component preferably does not contain the (meth)acrylamide. In the following, the formulation in which the second polymerization component does not contain the (meth)acrylamide is described.

Of the above-described polymerization components, the polymerization component other than the (meth)acrylamide and the tertiary amino monomer may be contained in the first polymerization component or the second polymerization component, or furthermore, may be contained in both of them.

To be specific, the (meth)allyl sulfonate contained in the polymerization component as an essential component may be contained in the first polymerization component or the second polymerization component, or furthermore, may be contained in both of them. That is, the first polymerization component and/or the second polymerization component contain(s) the (meth)allyl sulfonate.

Preferably, the (meth)allyl sulfonate is contained in only the first polymerization component or is contained in both of the first polymerization component and the second polymerization component.

The content ratio of the (meth)allyl sulfonate in the first polymerization component and the content ratio of the (meth)allyl sulfonate in the second polymerization component are appropriately set in accordance with the purpose and intended use.

Each of the optional components in the polymerization component may be contained in the first polymerization component or the second polymerization component, or furthermore, may be contained in both of them.

To be more specific, when the polymerization component contains the quaternary ammonium monomer as an optional component, the quaternary ammonium monomer may be contained in the first polymerization component or the second polymerization component, or furthermore, may be contained in both of them. Preferably, the quaternary ammonium monomer is contained in the first polymerization component.

When the polymerization component contains the anionic polymerizable monomer as an optional component, the anionic polymerizable monomer may be contained in the first polymerization component or the second polymerization component, or furthermore, may be contained in both of them. Preferably, the anionic polymerizable monomer is contained in the first polymerization component.

When the polymerization component contains a nitrogen-containing cross-linking monomer as an optional component, for example, the nitrogen-containing cross-linking monomer may be contained in the first polymerization component or the second polymerization component, or furthermore, may be contained in both of them. Preferably, the nitrogen-containing cross-linking monomer is contained in the second polymerization component.

In other words, preferably, the second polymerization component contains the nitrogen-containing cross-linking monomer. Preferably, the first polymerization component does not contain the nitrogen-containing cross-linking monomer, or the nitrogen-containing cross-linking monomer content is subtle.

In view of reduction of the (meth)acrylamide content in the paper product, the nitrogen-containing cross-linking monomer content in the first polymerization component with respect to 100 mol of the (meth)acrylamide in the first polymerization component is, for example, 0.1 mol or less, preferably 0.01 mol or less, more preferably 0 mol.

When the polymerization component contains the other polymerizable monomer as an optional component, for example, the other polymerizable monomer may be contained in the first polymerization component or the second polymerization component, or furthermore, may be contained in both of them. Preferably, the other polymerizable monomer is contained in the first polymerization component.

In the following, the details of a case where the polymerization component contains the (meth)acrylamide, the tertiary amino monomer, and the (meth)allyl sulfonate as an essential component, and furthermore, contains the quaternary ammonium monomer as an optional component are further described.

In this case, the content kind and the content ratio of each of the monomers (breakdown of the monomer) with respect to the first polymerization component and the second polymerization component may be any one of the following patterns.

TABLE 1

|  | Pattern 1 | | Pattern 2 | | Pattern 3 | | Pattern 4 | | Pattern 5 | |
| --- | --- | --- | --- | --- | --- | --- | --- | --- | --- | --- |
| — | First | Second | First | Second | First | Second | First | Second | First | Second |
| AM | Blending | — | Blending | — | Blending | — | Blending | — | Blending | — |
| Tertiary | — | Blending | — | Blending | — | Blending | — | Blending | — | Blending |
| Quaternary | Blending | — | Blending | — | Blending | — | — | Blending | — | Blending |
| Salt | Blending | — | — | Blending | Blending | Blending | Blending | — | — | Blending |

|  | Pattern 6 | | Pattern 7 | | Pattern 8 | | Pattern 9 | |
| --- | --- | --- | --- | --- | --- | --- | --- | --- |
| — | First | Second | First | Second | First | Second | First | Second |
| AM | Blending | — | Blending | — | Blending | — | Blending | — |
| Tertiary | — | Blending | — | Blending | — | Blending | — | Blending |
| Quaternary | — | Blending | Blending | Blending | Blending | Blending | Blending | Blending |
| Salt | Blending | Blending | Blending | — | — | Blending | Blending | Blending |

In Table, "First" represents the first polymerization component, and "Second" represents the second polymerization component. "AM" represents the (meth)acrylamide, "Tertiary" represents the tertiary amino monomer, "Quaternary" represents the quaternary ammonium monomer, and "Salt" represents the (meth)allyl sulfonate. "Blending" represents blending and "-" represents no blending (hereinafter, the same).

As one example, in the above-described Table 1, Pattern 1 shows the formulation in which the first polymerization component consists of the (meth)acrylamide, the quaternary ammonium monomer, and the (meth)allyl sulfonate, and the second polymerization component consists of the tertiary amino monomer. Pattern 2 shows the formulation in which the first polymerization component consists of the (meth)acrylamide and the quaternary ammonium monomer, and the second polymerization component consists of the tertiary amino monomer and the (meth)allyl sulfonate.

In this method, first, only the first polymerization component (portion of the polymerization component) is polymerized, so that a polymer (first polymer) of the first polymerization component is obtained (first polymerization step).

In the first polymerization step, in order to polymerize the first polymerization component, for example, the first polymerization component, a polymerization initiator, and a solvent are charged in a predetermined reaction vessel to be reacted. In this method, the first polymerization component may be collectively charged or divisionally charged in a plurality of times. Also, the reaction can be progressed, while a portion or all of the polymerization initiator is added dropwise to the reaction vessel.

An example of the polymerization initiator includes a radical polymerization initiator. To be specific, examples thereof include a peroxide compound, sulfides, sulfines, and sulfinic acids. More preferably, a peroxide compound is used. The peroxide compound may be used as a redox polymerization initiator by being used with a reducing agent in combination.

Examples of the peroxide compound include an organic peroxide and an inorganic peroxide. Preferably, an inorganic peroxide is used.

Examples of the organic peroxide include benzoyl peroxide, lauroyl peroxide, acetyl peroxide, caprylyl peroxide, 2,4-dichlorobenzoyl peroxide, isobutyl peroxide, acetyl cyclohexyl sulfonyl peroxide, t-butyl peroxypivalate, t-butylperoxy-2-ethylhexanoate, 1,1-di-t-butylperoxycyclohexane, 1,1-di-t-butylperoxy-3,3,5-trimethylcyclohexane, 1,1-di-t-hexylperoxy-3,3,5-trimethylcyclohexane, isopropyl peroxydicarbonate, isobutyl peroxydicarbonate, s-butyl peroxydicarbonate, n-butyl peroxydicarbonate, 2-ethylhexyl peroxydicarbonate, bis(4-t-butylcyclohexyl) peroxydicarbonate, t-amylperoxy-2-ethylhexanoate, 1,1,3,3-tetramethylbutylperoxy-ethylhexanoate, 1,1,2-trimethylpropylperoxy-2-ethylhexanoate, t-butyl peroxy isopropyl monocarbonate, t-amyl peroxy isopropyl monocarbonate, t-butyl peroxy-2-ethylhexyl carbonate, t-butyl peroxy allyl carbonate, t-butyl peroxy isopropyl carbonate, 1,1,3,3-tetramethylbutyl peroxy isopropyl monocarbonate, 1,1,2-trimethylpropyl peroxy isopropyl monocarbonate, 1,1,3,3-tetramethylbutyl peroxy isononate, 1,1,2-trimethylpropyl peroxy isononate, and t-butyl peroxy benzoate.

Examples of the inorganic peroxide include persulfates such as sodium persulfate, potassium persulfate, and ammonium persulfate; hydrogen peroxide; potassium permanganate; bromates such as sodium bromate and potassium bromate; perborates such as sodium perborate, potassium perborate, and ammonium perborate; percarbonates such as sodium percarbonate, potassium percarbonate, and ammonium percarbonate; and perphosphates such as sodium perphosphate, potassium perphosphate, and ammonium perphosphate. Preferably, persulfate is used, more preferably, potassium persulfate and ammonium persulfate are used, further more preferably, ammonium persulfate is used.

These polymerization initiators can be used alone or in combination of two or more.

As the polymerization initiator, an azo compound can be also used.

Examples of the azo compound include 2,2'-azobisisobutyronitrile, 2,2'-azobis(2-methylpropionamidine), and the salt thereof.

As the polymerization initiator, preferably, an inorganic peroxide is used, more preferably, a persulfate is used, or further more preferably, an ammonium persulfate is used.

By using the persulfate as the polymerization initiator, that is, by copolymerizing the first polymerization component under the presence of the persulfate, papermaking chemicals having excellent handleability can be provided.

The mixing ratio of the polymerization initiator with respect to 100 parts by mass of the total amount of the first polymerization component is, for example, 0.01 parts by mass or more, preferably 0.05 parts by mass or more, and for example, 10 parts by mass or less, preferably 5 parts by mass or less.

Examples of the solvent include water and solvents mixable with the water such as ketone solvents such as acetone and methyl ethyl ketone; monohydric alcohol solvents such as methanol, ethanol, propanol, isopropanol, and butanol; glycol ether solvents such as ethylene glycol monoethyl ether and propylene glycol monomethyl ether; and ester ether solvents such as propylene glycol monomethyl ether acetate. When tap water is used as the solvent, a chelating agent (ethylenediaminetetraacetic acid or the like) can be blended at an appropriate ratio, so that metal is removed.

These solvents can be used alone or in combination of two or more.

As the solvent, preferably, water is used.

When the water is used as the solvent, the (meth)acrylamide polymer is obtained as an aqueous solution thereof. When the solvent other than the water is used, the (meth)acrylamide polymer is obtained as a dispersion liquid thereof.

The aqueous solution of the (meth)acrylamide polymer obtained by using the water as the solvent can more excellently reduce the (meth)acrylamide content in the paper product in the case of the use for the production of paper.

The mixing ratio of the solvent is not particularly limited and can be appropriately set in accordance with the purpose and intended use.

In this method, along with the first polymerization component, the polymerization initiator, and the solvent described above, furthermore, a chain transfer agent (excluding the (meth)allyl sulfonate) can be also appropriately blended.

Examples of the chain transfer agent include isopropyl alcohol and mercaptos (for example, mercapto ethanol, thiourea, thioglycolic acid, mercaptopropionic acid, thiosalycilic acid, thiolactic acid, aminoethanethiol, thioglycerol, thiomalic acid, or the like).

These chain transfer agents can be used alone or in combination of two or more.

The mixing ratio of the chain transfer agent with respect to the total mol of the first polymerization component is, for example, 0.05 mol % or more, preferably 0.1 mol % or more, and for example, 10 mol % or less, preferably 5 mol % or less.

The polymerization conditions in the first polymerization step differ in accordance with the kind of the first polymerization component, the polymerization initiator, the solvent, or the like, and the polymerization temperature is, for example, 30° C. or more, preferably 50° C. or more, and for example, 100° C. or less, preferably 95° C. or less.

The polymerization time is, for example, 0.5 hours or more, preferably 1 hour or more, and for example, 24 hours or less, preferably 12 hours or less.

The reaction solution at the time of polymerization has a pH of, for example, 1 or more, preferably 2 or more, and for example, 6 or less, preferably 5 or less. The pH can be adjusted by adding a known acid such as hydrochloric acid, sulfuric acid, and phosphoric acid.

By the polymerization reaction, a solution containing the first polymer can be obtained.

In the first polymerization step, the polymerization reaction can be terminated by adding a known polymerization terminator (for example, sodium sulfite or the like) as needed. Preferably, after the first polymerization step, the obtained solution (solution containing the first polymer) is subjected to the second polymerization step to be described later without terminating the polymerization reaction.

Preferably, the solution obtained in the first polymerization step does not contain the unreacted (meth)acrylamide, or the first polymerization component content is subtle.

The content ratio of the unreacted (meth)acrylamide in the solution obtained in the first polymerization step with respect to the first polymer is, for example, 0.1 mol % or less, preferably 0.01 mol % or less, more preferably 0 mol %. That is, preferably, the solution obtained in the first polymerization step does not contain the unreacted (meth) acrylamide.

The unreacted (meth)acrylamide content can be measured in conformity with Examples to be described later. The solution obtained in the first polymerization step is subjected to refining treatment by a known method such as distillation and extraction as needed, so that the unreacted (meth) acrylamide content can be also reduced.

Next, in this method, the above-described second polymerization component is polymerized under the presence of the first polymer obtained in the above-described first polymerization step, so that a (meth)acrylamide polymer is obtained (second polymerization step).

To polymerize the second polymerization component, for example, the second polymerization component is added to the solution (containing the first polymer) obtained in the above-described first polymerization step to be reacted. Also, the above-described polymerization initiator, the above-described solvent, the above-described chain transfer agent, or the like can be further added as needed.

In this method, the second polymerization component may be collectively charged or divisionally charged in a plurality of times.

The polymerization conditions in the second polymerization step differ in accordance with the kind of the second polymerization component, and the polymerization temperature is, for example, 30° C. or more, preferably 50° C. or more, and for example, 100° C. or less, preferably 95° C. or less.

The polymerization time is, for example, 0.5 hours or more, preferably 1 hour or more, and for example, 24 hours or less, preferably 12 hours or less.

The reaction solution at the time of polymerization has a pH of, for example, 1 or more, preferably 2 or more, and for example, 6 or less, preferably 5 or less. The pH can be adjusted by adding a known acid such as hydrochloric acid, sulfuric acid, and phosphoric acid.

The polymerization reaction in the second polymerization step is usually terminated by adding a known polymerization terminator (for example, sodium sulfite or the like).

By the polymerization reaction, a (meth)acrylamide polymer papermaking additive can be obtained as a solution (preferably, an aqueous solution) of the (meth)acrylamide polymer.

In the (meth)acrylamide polymer papermaking additive, the concentration of the (meth)acrylamide polymer is, for example, 10 mass % or more, preferably 20 mass % or more, and for example, 50 mass % or less, preferably 45 mass % or less.

The (meth)acrylamide polymer has a weight average molecular weight of, for example, 1,500,000 or more, preferably 3,000,000 or more, and for example, 15,000,000 or less, preferably 10,000,000 or less.

The weight average molecular weight of the (meth) acrylamide polymer can be, for example, appropriately adjusted in accordance with the kind, the mixing amount, or the like of the polymerization component.

The measurement method of the weight average molecular weight is in conformity with Examples to be described later.

The viscosity (the non-volatile content (solid content) of 20 mass % (at 25° C.)) of the solution of the (meth) acrylamide polymer is, for example, 100 mP·s or more, preferably 1000 mP·s or more, and for example, 50000 mP·s or less, preferably 20000 mP·s or less.

The measurement method of the viscosity is in conformity with Examples to be described later.

In the above-described method for producing a (meth) acrylamide polymer papermaking additive, in the first polymerization step, the (meth)acrylamide is polymerized, and the tertiary amino monomer is hardly (or never) polymerized. Meanwhile, in the second polymerization step, the tertiary amino monomer is polymerized under the environment in which the (meth)acrylamide is hardly (or never) present.

Thus, according to the method for producing a (meth) acrylamide polymer papermaking additive, in the case of the use for the production of paper, the (meth)acrylamide polymer papermaking additive that is capable of retaining properties as the papermaking additive and reducing the (meth) acrylamide content in the paper product to be obtained can be excellently produced.

According to the (meth)acrylamide polymer papermaking additive obtained in the above-described method, in the case of the use for the production of paper, the properties as the papermaking additive are capable of being retained and the (meth)acrylamide content in the paper product to be obtained is capable of being reduced.

In the above-described method, in the first polymerization step, the first polymerization component is polymerized in one step, and thereafter, in the second polymerization step, the second polymerization component is polymerized in one step. Also, in the first polymerization step and/or the second polymerization step, the polymerization component can be subjected to a multi-step polymerization.

Preferably, in the first polymerization step, the first polymerization component is subjected to the multi-step polymerization and/or in the second polymerization step, the second polymerization component is subjected to the multi-step polymerization.

When the first polymerization component is subjected to the multi-step polymerization, the number of the step is not particularly limited, and examples thereof is, for example, two steps or more, and for example, four steps or less, preferably three steps or less, more preferably two steps.

When the second polymerization component is subjected to the multi-step polymerization, the number of the step is not particularly limited, and examples thereof is, for example, two steps or more, and for example, four steps or less, preferably three steps or less, more preferably two steps.

Particularly preferably, in the first polymerization step, the first polymerization component is subjected to the multi-step polymerization (preferably, two-step polymerization), and in the second polymerization step, the second polymerization step is subjected to a one-step polymerization without being subjected to the multi-step polymerization.

When the first polymerization component is subjected to the two-step polymerization and the second polymerization component is subjected to the one-step polymerization, as a whole, the polymerization component is polymerized in three steps (hereinafter, referred to as the three steps of step A, step B, and step C).

In this case, for example, the first polymerization component is divided into two (hereinafter, one is referred to as a first polymerization component A, and the other is referred to as a first polymerization component B).

At this time, the content kind and the content ratio of each of the monomers (breakdown of the monomer) in the first polymerization component A and the first polymerization component B may be the same or different from each other.

To be more specific, for example, in Pattern 1 described in the above-described Table 1, the first polymerization component contains the quaternary ammonium monomer and the (meth)allyl sulfonate in addition to the (meth)acrylamide. When the first polymerization component is divided into the first polymerization component A and the first polymerization component B, the quaternary ammonium monomer and the (meth)allyl sulfonate may be contained in at least any one of the first polymerization component A and the first polymerization component B, or may be contained in both of the first polymerization component A and the first polymerization component B.

In this case, as shown in the following Tables 2 to 10, Patterns 1 to 9 described in the above-described Table 1 are further divided into the patterns.

In the following, "First-A" represents the first polymerization component A, and "First-B" represents the first polymerization component B.

TABLE 2

| | Pattern 1 (1) | | | Pattern 1 (2) | | | Pattern 1 (3) | | |
|---|---|---|---|---|---|---|---|---|---|
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | Blending | Blending | — | Blending | Blending | — | Blending | Blending | — |
| Salt | Blending | Blending | — | Blending | — | — | — | Blending | — |
| | Pattern 1 (4) | | | Pattern 1 (5) | | | Pattern 1 (6) | | |
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | — | Blending | — | Blending | — | — | Blending | — | — |
| Salt | Blending | Blending | — | Blending | Blending | — | Blending | — | — |
| | Pattern 1 (7) | | | Pattern 1 (8) | | | Pattern 1 (9) | | |
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | — | Blending | — | Blending | — | — | — | Blending | — |
| Salt | — | Blending | — | — | Blending | — | Blending | — | — |

TABLE 3

| | Pattern 2 (1) | | | Pattern 2 (2) | | | Pattern 2 (3) | | |
|---|---|---|---|---|---|---|---|---|---|
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | Blending | Blending | — | Blending | — | — | — | Blending | — |
| Salt | — | — | Blending | — | — | Blending | — | — | Blending |

TABLE 4

| | Pattern 3 (1) | | | Pattern 3 (2) | | | Pattern 3 (3) | | |
|---|---|---|---|---|---|---|---|---|---|
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | Blending | Blending | — | Blending | Blending | — | Blending | Blending | — |
| Salt | Blending | Blending | Blending | Blending | — | Blending | — | Blending | Blending |
| | Pattern 3 (4) | | | Pattern 3 (5) | | | Pattern 3 (6) | | |
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | — | Blending | — | Blending | — | — | Blending | — | — |
| Salt | Blending | Blending | Blending | Blending | — | Blending | Blending | — | Blending |

TABLE 4-continued

|  | Pattern 3 (7) | | | Pattern 3 (8) | | | Pattern 3 (9) | | |
| --- | --- | --- | --- | --- | --- | --- | --- | --- | --- |
|  | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | — | Blending | — | Blending | — | — | — | Blending | — |
| Salt | — | Blending | Blending | — | Blending | Blending | Blending | — | Blending |

TABLE 5

|  | Pattern 4 (1) | | | Pattern 4 (2) | | | Pattern 4 (3) | | |
| --- | --- | --- | --- | --- | --- | --- | --- | --- | --- |
|  | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | — | — | Blending | — | — | Blending | — | — | Blending |
| Salt | Blending | Blending | — | Blending | — | — | — | Blending | — |

TABLE 6

| Table 6 | | | |
| --- | --- | --- | --- |
|  | Pattern 5 (1) | | |
|  | First-A A | First-B B | Second C |
| AM | Blending | Blending | — |
| Tertiary | — | — | Blending |
| Quaternary | — | — | Blending |
| Salt | — | — | Blending |

TABLE 7

|  | Pattern 6 (1) | | | Pattern 6 (2) | | | Pattern 6 (3) | | |
| --- | --- | --- | --- | --- | --- | --- | --- | --- | --- |
|  | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | — | — | Blending | — | — | Blending | — | — | Blending |
| Salt | Blending | Blending | Blending | Blending | — | Blending | — | Blending | Blending |

TABLE 8

|  | Pattern 7 (1) | | | Pattern 7 (2) | | | Pattern 7 (3) | | |
| --- | --- | --- | --- | --- | --- | --- | --- | --- | --- |
|  | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | Blending | Blending | Blending | Blending | Blending | Blending | Blending | Blending | Blending |
| Salt | Blending | Blending | — | Blending | — | — | — | Blending | — |
|  | Pattern 7 (4) | | | Pattern 7 (5) | | | Pattern 7 (6) | | |
|  | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | — | Blending | Blending | Blending | — | Blending | Blending | — | Blending |
| Salt | Blending | Blending | — | Blending | Blending | — | Blending | Blending | — |

TABLE 8-continued

|  | Pattern 7 (7) | | | Pattern 7 (8) | | | Pattern 7 (9) | | |
| --- | --- | --- | --- | --- | --- | --- | --- | --- | --- |
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | — | Blending | Blending | Blending | — | Blending | — | Blending | Blending |
| Salt | — | Blending | — | — | Blending | — | Blending | — | — |

TABLE 9

|  | Pattern 8 (1) | | | Pattern 8 (2) | | | Pattern 8 (3) | | |
| --- | --- | --- | --- | --- | --- | --- | --- | --- | --- |
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | Blending | Blending | Blending | Blending | — | Blending | — | Blending | Blending |
| Salt | — | — | Blending | — | — | Blending | — | — | Blending |

TABLE 10

|  | Pattern 9 (1) | | | Pattern 9 (2) | | | Pattern 9 (3) | | |
| --- | --- | --- | --- | --- | --- | --- | --- | --- | --- |
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | Blending | Blending | Blending | Blending | Blending | Blending | Blending | Blending | Blending |
| Salt | Blending | Blending | Blending | Blending | — | Blending | — | Blending | Blending |

|  | Pattern 9 (4) | | | Pattern 9 (5) | | | Pattern 9 (6) | | |
| --- | --- | --- | --- | --- | --- | --- | --- | --- | --- |
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | — | Blending | Blending | Blending | — | Blending | Blending | — | Blending |
| Salt | Blending | Blending | Blending | Blending | Blending | Blending | Blending | — | Blending |

|  | Pattern 9 (7) | | | Pattern 9 (8) | | | Pattern 9 (9) | | |
| --- | --- | --- | --- | --- | --- | --- | --- | --- | --- |
| — | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | — | Blending | Blending | Blending | — | Blending | — | Blending | Blending |
| Salt | — | Blending | Blending | — | Blending | Blending | Blending | — | Blending |

Furthermore, the polymerization component can also contain a monomer that is not described in Tables 2 to 10 (monomer excluding the (meth)acrylamide, the tertiary amino monomer, the (meth)allyl sulfonate, and the quaternary ammonium monomer). To be more specific, the polymerization component can also contain, for example, an anionic polymerizable monomer or the like.

In this case, the anionic polymerizable monomer may be contained in the first polymerization component or the second polymerization component, or furthermore, may be contained in both of them.

When the first polymerization component is subjected to the multi-step polymerization, the anionic polymerizable monomer may be contained in the polymerization component in any one of the steps.

To be more specific, when the first polymerization component is subjected to the two-step polymerization in the first polymerization step, and the second polymerization component is subjected to the one-step polymerization in the second polymerization step, the anionic polymerizable monomer may be contained in any polymerization component of the first polymerization component (the first polymerization component A, the first polymerization component B) and the second polymerization component, or may be contained in the plurality of polymerization components.

As one example, in Pattern 1 (1) described in the above-described Table 2, when the polymerization component further contains the anionic polymerizable monomer, as shown in Table 11, the anionic polymerizable monomer may be added to any polymerization component of the first polymerization component (the first polymerization component A, the first polymerization component B) and the second polymerization component.

In Table 11, "Anion" represents the anionic polymerizable monomer. Although the details are not described, the same applies to the other patterns.

TABLE 11

| | Pattern 1 (1)-1 | | | Pattern 1 (1)-2 | | | Pattern 1 (1)-3 | | |
|---|---|---|---|---|---|---|---|---|---|
| | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | Blending | Blending | — | Blending | Blending | — | Blending | Blending | — |
| Salt | Blending | Blending | — | Blending | Blending | — | Blending | Blending | — |
| Anion | Blending | — | — | — | Blending | — | — | — | Blending |

| | Pattern 1 (1)-4 | | | Pattern 1 (1)-5 | | | Pattern 1 (1)-6 | | |
|---|---|---|---|---|---|---|---|---|---|
| | First-A A | First-B B | Second C | First-A A | First-B B | Second C | First-A A | First-B B | Second C |
| AM | Blending | Blending | — | Blending | Blending | — | Blending | Blending | — |
| Tertiary | — | — | Blending | — | — | Blending | — | — | Blending |
| Quaternary | Blending | Blending | — | Blending | Blending | — | Blending | Blending | — |
| Salt | Blending | Blending | — | Blending | Blending | — | Blending | Blending | — |
| Anion | Blending | Blending | — | Blending | — | Blending | — | Blending | Blending |

| | Pattern 1 (1)-7 | | |
|---|---|---|---|
| | First-A A | First-B B | Second C |
| AM | Blending | Blending | — |
| Tertiary | — | — | Blending |
| Quaternary | Blending | Blending | — |
| Salt | Blending | Blending | — |
| Anion | Blending | Blending | Blending |

In this method, first, the first polymerization component A is polymerized in the same manner as that of the above-described first polymerization step (first polymerization step A).

As the polymerization conditions in the first polymerization step A, the polymerization temperature is, for example, 30° C. or more, preferably 50° C. or more, and for example, 100° C. or less, preferably 95° C. or less.

The polymerization time is, for example, 1 minute or more, preferably 3 minutes or more, and for example, 12 hours or less, preferably 6 hours or less.

In the first polymerization step A, the polymerization reaction can be terminated by adding a known polymerization terminator (for example, sodium sulfite or the like) as needed. Preferably, after the first polymerization step A, the obtained solution is subjected to a first polymerization step B to be described later without terminating the polymerization reaction.

Next, the first polymerization component B is added to the solution obtained in the first polymerization step A to be reacted (first polymerization step B).

As the polymerization conditions in the first polymerization step B, the polymerization temperature is, for example, 30° C. or more, preferably 50° C. or more, and for example, 100° C. or less, preferably 95° C. or less.

The polymerization time is, for example, 1 minute or more, preferably 3 minutes or more, and for example, 12 hours or less, preferably 6 hours or less.

By the polymerization reaction, a solution containing the first polymer (preferably, an aqueous solution) can be obtained.

Thereafter, in this method, a second polymerization component (hereinafter, referred to as a second polymerization component C) is added to the solution obtained in the first polymerization step B (solution containing the first polymer) to be reacted (second polymerization step C).

As the polymerization conditions in the second polymerization step, the polymerization temperature is, for example, 30° C. or more, preferably 50° C. or more, and for example, 100° C. or less, preferably 95° C. or less.

The polymerization time is, for example, 0.5 hours or more, preferably 1 hour or more, and for example, 24 hours or less, preferably 12 hours or less.

The polymerization reaction in the second polymerization step is usually terminated by adding a known polymerization terminator (for example, sodium sulfite or the like).

In this manner, a solution (preferably, an aqueous solution) of the (meth)acrylamide polymer can be obtained as the second polymer.

In this manner, in the first polymerization step and/or the second polymerization step (preferably, the first polymerization step), when the polymerization component is subjected to the multi-step polymerization, a molecular structure of the obtained (meth)acrylamide polymer can be controlled in a desired tendency, so that the (meth)acrylamide polymer papermaking additive that is more excellently capable of increasing the paper strength, and the (meth)acrylamide polymer papermaking additive that is more excellently capable of improving the yield can be obtained.

In the above-described description, the polymerization component is used by being divided into the two of the first polymerization component containing the (meth)acrylamide and the second polymerization component containing the tertiary amino monomer. In addition, for example, a third polymerization component that does not contain either the (meth)acrylamide or the tertiary amino monomer can be also used.

In this case, the polymerization component is used by being divided into the first polymerization component that contains at least the (meth)acrylamide, the second polymerization component that contains at least the tertiary amino monomer, and the third polymerization component that does not contain either the (meth)acrylamide or the tertiary amino monomer.

In this case, the third polymerization component does not contain the (meth)acrylamide and the tertiary amino monomer, and contains the (meth)allyl sulfonate and/or an optional component (for example, the quaternary ammonium monomer, the anionic polymerizable monomer, the cross-linking monomer containing nitrogen, another polymerizable monomer, or the like).

The third polymerization component may be, for example, polymerized before the first polymerization step, between the first polymerization step and the second polymerization step, or furthermore, after the second polymerization step. When the third polymerization component contains the cross-linking monomer containing nitrogen, the third polymerization component is preferably polymerized after the first polymerization step.

In the above-described method for producing a (meth)acrylamide polymer papermaking additive, in the first polymerization step, the (meth)acrylamide is polymerized and the tertiary amino monomer is hardly (or never) polymerized. Meanwhile, in the second polymerization step, the tertiary amino monomer is polymerized under the environment in which the (meth)acrylamide is hardly (or never) present.

Thus, in the method for producing a (meth)acrylamide polymer papermaking additive, in the case of the use for the production of paper, the (meth)acrylamide polymer papermaking additive that is capable of retaining properties as the papermaking additive and reducing the (meth)acrylamide content in the paper product to be obtained can be excellently produced.

According to the (meth)acrylamide polymer papermaking additive obtained in this method, in the case of the use for the production of paper, the properties as the papermaking additive are capable of being retained and the (meth)acrylamide content in the paper product to be obtained is capable of being reduced.

To be more specific, the above-described (meth)acrylamide polymer papermaking additive is added to a pulp slurry to be subjected to a wet papermaking process, thereby producing paper. The method for wet papermaking is not particularly limited and a known method can be used. The method can be widely used in various papermaking regardless of acid paper with aluminum sulfate as a fixer or neutralized paper with calcium carbonate as a filler. Examples of the paper obtained by the wet papermaking include news print paper, ink jet paper, thermal recording body paper, pressure-sensitive recording body paper, wood free paper, paperboard, coated paper, household paper, and another paper.

The mixing ratio of the (meth)acrylamide polymer papermaking additive and the pulp slurry is not particularly limited. The mixing ratio of the (meth)acrylamide polymer (solid content) with respect to 100 parts by mass of the pulp slurry is, for example, 0.001 parts by mass or more, preferably 0.005 parts by mass or more, and for example, 5.0 parts by mass or less, preferably 2.0 parts by mass or less.

The paper thus obtained has excellent paper strength and/or excellent yield rate.

That is, the above-described (meth)acrylamide polymer papermaking additive is preferably used as a paper strengthening agent and/or a retention aid.

The paper obtained by using the above-described (meth)acrylamide polymer papermaking additive has the reduced (meth)acrylamide content.

To be specific, the (meth)acrylamide content in the paper is, for example, 0.2 ppm or less, preferably 0.1 ppm or less as a value obtained by extracting the (meth)acrylamide in conformity with Examples to be described later to be converted into an extraction amount of the (meth)acrylamide per paper mass.

Thus, the paper thus obtained is preferably used as a food packaging paper.

As described above, the present invention includes the invention of a (meth)acrylamide polymer papermaking additive.

To be specific, the present invention includes the (meth)acrylamide polymer papermaking additive obtained by first polymerizing the first polymerization component that contains at least the (meth)acrylamide and next, polymerizing the second polymerization component that contains at least the tertiary amino monomer under the presence of the obtained polymer.

As described above, the (meth)acrylamide polymer papermaking additive is specified by the producing method.

However, as described below, in the (meth)acrylamide polymer papermaking additive, there are circumstances in which direct specification is impossible or not practical according to its structure or properties.

That is, the (meth)acrylamide polymer is usually produced by radical polymerization. In the radical polymerization, each of the monomers that is a material of the (meth)acrylamide polymer is radically polymerized, and along with the progress of the polymerization, hydrogen is removed from the obtained (meth)acrylamide polymer (oligomer), and the polymerization reaction (radical addition) originating from the (meth)acrylamide polymer (oligomer) is initiated.

Furthermore, the polymerization reaction (radical addition) is initiated originating from the branched (meth)acrylamide polymer (oligomer) that is thus formed.

The (meth)acrylamide polymer obtained by the repeating polymerization reaction has complicated and various branched structures. Furthermore, as long as a radical continues to be produced by a radical polymerization initiator, a (meth)acrylamide polymer having an unspecified large number of branched chains is produced at random instead of the completion of the reaction at the time of the production of a specific branched structure.

Also, when a straight-chain structure and/or branched structure of the (meth)acrylamide polymer are/is analyzed by combining gel permeation chromatography (GPC), a light scattering method, or the like, only an approximate degree in size of the branched chain becomes clear, and the structure and the properties thereof cannot be specified.

The polymerization component (monomer component) that is present in the reaction system at the time of the production of the branched chain is capable of being judged from the mixing formulation or the like. A covalent bond is, however, progressed at random between the (meth)acrylamide polymers and a complicated branched structure is formed, so that the structure and the properties thereof cannot be specified.

As described above, the (meth)acrylamide polymer papermaking additive is specified by the producing method, and there are circumstances in which the direct specification is impossible or not practical according to its structure or properties.

In the specification and the scope of claims, any numerical value that is lower than the numerical value described after the decimal point is 0.

To be more specific, in the specification and the scope of claims, for example, when the numerical value is described until the first place of decimals (for example, 0.1), any numerical value after the second place of decimals is 0 (for example, 0.10).

EXAMPLES

Next, the present invention is described based on Examples and Comparative Examples. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Example 1

<First Polymerization Step (Two-Step Polymerization)>

A first polymerization component A, a first polymerization component B, and a second polymerization component C were prepared in the formulation described in Table 12.

The first polymerization component A was diluted with tap water so that the concentration thereof was 30 mass %.

Next, the obtained solution was charged into a 500 mL separable flask.

Next, sulfuric acid was added to the solution, and a pH thereof was adjusted to about 2.5.

Thereafter, while nitrogen was continued being blown into the solution, ammonium persulphate (APS) as a polymerization initiator was added dropwise at 60° C. to be polymerized (first polymerization step A).

The first polymerization component B was added dropwise over 60 minutes 5 minutes after the solution reached the maximum temperature for an increase in temperature along with the polymerization, and the mixture was reacted for 60 minutes after the completion of the dropping of the first polymerization component B (first polymerization step B).

A portion of the solution (10 g) was collected after the reaction in the first polymerization step B for 60 minutes. Then, 1 g of 5% aqueous solution of hydroquinone that was a polymerization inhibitor was added to the collected solution, and thereafter, the obtained solution was forcibly cooled by being put into a refrigerator to terminate the consumption of the acrylamide caused by the progress of the polymerization. Then, it was confirmed that the acrylamide content in the solution was 0 mol in accordance with <Remaining Amount of Acrylamide> to be described later.

Also, the second polymerization component C was added dropwise over 60 minutes to the solution obtained 60 minutes after the reaction in the first polymerization step B (second polymerization step C).

During or after the above-described dropping of the first polymerization component A, the first polymerization component B, and the second polymerization component C, the ammonium persulphate (APS) as a polymerization initiator was added until the appropriate viscosity (about 5000 mPa·s) and the reaction was continued around 80° C.

Thereafter, $Na_2SO_3$ as a polymerization terminator (reducing agent) and dilution water were added to be cooled, thereby obtaining an aqueous solution of a (meth)acrylamide polymer. This was defined as a (meth)acrylamide polymer papermaking additive.

The solid content concentration of the aqueous solution was 21.9 mass %, and the viscosity thereof was 6000 mPa·s, and the pH thereof was 4.10.

Also, the viscosity at 25° C. of the aqueous solution and the weight average molecular weight (Mw) of the (meth)acrylamide polymer were measured by the following method. The results are shown in Table 12.

Furthermore, the amount of the free acrylamide that remained in the aqueous solution was obtained as a ratio to the total amount of the solid content ((meth)acrylamide polymer) by the following method. The results are shown in Table 12.

<Measurement of Viscosity at 25° C.>

The viscosity at 25° C. was measured in conformity with JIS K 7117-1 (1999) using a B-type viscometer (rotor No. 3, 12 rpm) (TVB-10-type viscometer, manufactured by TOKI SANGYO CO., LTD.).

<Measurement of Weight Average Molecular Weight (Mw) with Gel Permeation Chromatography>

A sample was dissolved in a phosphate buffer having a pH of 7 and the concentration of the sample was adjusted to 1.0 g/L to be measured with gel permeation chromatography (GPC). The weight average molecular weight (Mw) of the sample was calculated from the obtained chromatogram (chart). The measurement device and the measurement conditions are shown below.

Device: part number TDA-302 (manufactured by Viscotek)

Column: part number TSKgel $GMPW_{XL}$ (manufactured by Tosoh Corporation)

Mobile phase: phosphate buffer

Column flow rate: 0.8 mL/min

Concentration of sample: 1.0 g/L

Injection amount: 500 µL

<Remaining Amount of Acrylamide>

An aqueous solution of 0.1 mass % phosphoric acid was added to the sample solution to be diluted to 5 mg/mL and thereafter, the diluted solution was filtered with a 1 µm membrane filter to obtain a measurement sample solution.

Next, 100 mg of acrylamide sample (>98.0%, manufactured by Tokyo Chemical Industry Co., Ltd.) was weighed with an electronic balance to make up constant 1 L measuring flask volume. By using the measuring flask and a transfer pipet, the obtained solution (acrylamide: 100 mg/L) was adjusted to 10.0 mg/L, 1.0 mg/L, 0.5 mg/L, 0.1 mg/L, and 0.05 mg/L, so that standard samples were obtained.

By using the obtained standard samples, the acrylamide was analyzed with a high performance liquid chromatograph (HPLC) analysis device under the measurement conditions shown below, so that a calibration curve was obtained by an absolute calibration curve method.

Thereafter, by using the measurement sample solution obtained in the description above, the analysis was carried out by using the high performance liquid chromatograph (HPLC) analysis device under the measurement conditions shown below, so that the concentration [mg/L] of the remaining acrylamide that was contained in the aqueous solution of the (meth)acrylamide polymer was obtained from the calibration curve.

Device: high performance liquid chromatograph, Chromaster (manufactured by Hitachi High-Technologies Corporation)
Column: LaChrom C18-AQ (5 µm) (manufactured by Hitachi High-Technologies Corporation)
Guard column: LaChrom C18-AQ (5 µm)-G (manufactured by Hitachi High-Technologies Corporation)
Detected wavelength: 220 nm
Temperature: 40° C.
Eluent: ultrapure water
Flow rate: 1.00 mL/min Examples 2 to 18 and Comparative Examples 1 to 4

A solution of the (meth)acrylamide polymer was obtained in the same manner as that of Example 1 except that the mixing formulation was changed to that shown in Tables 12 to 16. The obtained solution was defined as the (meth)acrylamide polymer papermaking additive.

The viscosity at 25° C. of the aqueous solution and the weight average molecular weight (Mw) of the (meth)acrylamide polymer were measured in the same manner as that of Example 1. Furthermore, the amount of the free acrylamide that remained in the aqueous solution was obtained in the same manner as that of Example 1. The results are shown in Tables 12 to 16.

In Example 8, the tertiary amino monomer was contained in the first polymerization component (first polymerization component B). The ratio of the tertiary amino monomer with respect to 100 mol of the acrylamide in the first polymerization component (the total amount of the first polymerization component A and the first polymerization component B) was adjusted to 0.09 mol.

In Examples 10 to 12, the first polymerization component was used without being divided into two. The acrylamide content in the solution was confirmed to be 0 mol 60 minutes after the reaction from the completion of the dropping of the first polymerization component. Then, the second polymerization component was added.

In Example 13, the acrylamide was contained in the second polymerization component (second polymerization component C). The ratio of the acrylamide with respect to 100 mol of the tertiary amino monomer in the second polymerization component (second polymerization component C) was adjusted to 0.9 mol.

In Comparative Example 1, the mixing order of the first polymerization component and the second polymerization component was reversed compared to that of Example 1. That is, first, the second polymerization component C was polymerized, next, the first polymerization component A was polymerized, and thereafter, the first polymerization component B was polymerized.

In Comparative Example 2, the first polymerization component A and the second polymerization component C in Example 1 were collectively charged to be polymerized, and thereafter, the first polymerization component B was polymerized.

In Comparative Example 3, the tertiary amino monomer was contained in the first polymerization component (first polymerization component B). The ratio of the tertiary amino monomer with respect to 100 mol of the acrylamide in the first polymerization component (the total amount of the first polymerization component A and the first polymerization component B) was adjusted to 0.11 mol.

In Comparative Example 4, the acrylamide was contained in the second polymerization component (second polymerization component C). The ratio of the acrylamide with respect to 100 mol of the tertiary amino monomer in the second polymerization component (second polymerization component C) was adjusted to 4.5 mol.

TABLE 12

| | | | | | Example 1 | | | Example 2 | | | Example 3 | | |
|---|---|---|---|---|---|---|---|---|---|---|---|---|---|
| | Polymerization Component | | | | First-A | First-B | Sec-ond-C | First-A | First-B | Sec-ond-C | First-A | First-B | Sec-ond-C |
| | Ratio in Total Amount of Polymerization Component [mol %] | | | | 58.20 | 37.30 | 4.50 | 28.30 | 68.20 | 3.50 | 45.65 | 45.54 | 8.81 |
| Mixing Formulation | Polymerization Component [mol %] | Acrylamide | AM | | 55.00 | 36.70 | — | 24.20 | 67.00 | — | 45.05 | 45.05 | — |
| | | Quaternary Ammonium Monomer | DADMAC | | — | — | — | 3.00 | — | — | — | — | — |
| | | | DM-BQ | | 0.40 | 0.60 | — | — | — | 0.40 | — | — | 2.30 |
| | | | DA-BQ | | — | — | — | — | — | 0.10 | — | — | — |
| | | | DMC | | — | — | — | — | — | — | — | — | 0.20 |
| | | Tertiary Amino Monomer | DM | | — | — | 4.50 | — | — | 2.00 | — | — | 2.50 |
| | | | DMAPAA | | — | — | — | — | — | — | — | — | 0.50 |
| | | α, β-Unsaturated Carboxylic Acid | IA | | 1.80 | — | — | 0.30 | 1.00 | — | — | — | 0.30 |
| | | | AA | | — | — | — | — | — | 1.00 | — | — | 3.00 |
| | | Nitrogen-Containing Cross-Linking Monomer | DMAA | | — | — | — | — | — | — | — | — | — |
| | | | MBAM | | — | — | — | — | — | — | — | — | — |
| | | Another Polymerizable Monomer | MMA | | — | — | — | — | — | — | — | — | — |
| | | (Meth)Allyl Sulfonate | SMAS | | 1.00 | — | — | 0.80 | 0.20 | — | 0.60 | 0.49 | 0.01 |
| | Polymerization Initiator | Kind | | | APS | | | APS | | | APS | | |

TABLE 12-continued

|  |  |  |  | No. | | | | | |
|---|---|---|---|---|---|---|---|---|---|
|  |  |  |  | Example 4 | | | Example 5 | | |
|  |  | Polymerization Component |  | First-A | First-B | Second-C | First-A | First-B | Second-C |
| Properties | Aqueous Solution | Solid Content [%] |  | 21.9 | | | 20.8 | | 21.0 |
|  |  | pH |  | 4.10 | | | 3.90 | | 3.70 |
|  |  | Viscosity [mPa·s] |  | 6,000 | | | 8,100 | | 8,200 |
|  | Acrylamide Polymer | Molecular Weight [10000 Da] |  | 354 | | | 377 | | 415 |
|  | Remaining AM Amount [ppm/Total Amount of Solid Content] |  |  | 75 | | | 72 | | 68 |
| Evaluation | AM Amount per Paper Weight [ppm] |  |  | 0.03 | | | 0.06 | | 0.07 |
|  | IB [mJ] |  |  | 238 | | | 234 | | 230 |
|  | Retention Rate [%] |  |  | 75 | | | 71 | | 70 |

|  |  |  |  | No. | | | | | |
|---|---|---|---|---|---|---|---|---|---|
|  |  |  |  | Example 4 | | | Example 5 | | |
|  |  | Polymerization Component |  | First-A | First-B | Second-C | First-A | First-B | Second-C |
|  | | Ratio in Total Amount of Polymerization Component [mol %] | | 58.80 | 36.70 | 4.50 | 57.00 | 37.30 | 5.50 |
| Mixing Formulation | Polymerization Component [mol %] | Acrylamide | AM | 56.00 | 36.70 | — | 53.80 | 36.70 | — |
|  |  | Quaternary Ammonium Monomer | DADMAC | — | — | — | — | — | — |
|  |  |  | DM-BQ | — | — | — | 0.40 | 0.60 | — |
|  |  |  | DA-BQ | — | — | — | — | — | — |
|  |  |  | DMC | — | — | — | — | — | — |
|  |  | Tertiary Amino Monomer | DM | — | — | 4.50 | — | — | 4.50 |
|  |  |  | DMAPAA | — | — | — | — | — | — |
|  |  | α,β-Unsaturated Carboxylic Acid | IA | 1.80 | — | — | 1.80 | — | — |
|  |  |  | AA | — | — | — | — | — | 1.00 |
|  |  | Nitrogen-Containing | DMAA | — | — | — | — | — | — |
|  |  | Cross-Linking Monomer | MBAM | — | — | — | — | — | — |
|  |  | Another Polymerizable Monomer | MMA | — | — | — | — | — | — |
|  |  | (Meth)Allyl Sulfonate | SMAS | 1.00 | — | — | 1.00 | — | — |
|  | Polymerization Initiator | Kind |  | APS | | | APS | | |
| Properties | Aqueous Solution | Solid Content [%] |  | 21.3 | | | 20.7 | | |
|  |  | pH |  | 4.20 | | | 3.90 | | |
|  |  | Viscosity [mPa·s] |  | 6,500 | | | 8,200 | | |
|  | Acrylamide Polymer | Molecular Weight [10000 Da] |  | 403 | | | 368 | | |
|  | Remaining AM Amount [ppm/Total Amount of Solid Content] |  |  | 66 | | | 60 | | |
| Evaluation | AM Amount per Paper Weight [ppm] |  |  | 0.03 | | | 0.04 | | |
|  | IB [mJ] |  |  | 240 | | | 233 | | |
|  | Retention Rate [%] |  |  | 67 | | | 72 | | |

TABLE 13

|  |  |  |  | No. | | | | | |
|---|---|---|---|---|---|---|---|---|---|
|  |  |  |  | Example 6 | | | Example 7 | | |
|  |  | Polymerization Component |  | First-A | First-B | Second-C | First-A | First-B | Second-C |
|  | | Ratio in Total Amount of Polymerization Component [mol %] | | 57.15 | 37.30 | 5.55 | 57.20 | 37.30 | 5.50 |
| Mixing Formulation | Polymerization Component [mol %] | Acrylamide | AM | 53.95 | 36.70 | — | 53.50 | 36.70 | — |
|  |  | Quaternary Ammonium Monomer | DADMAC | — | — | — | — | — | — |
|  |  |  | DM-BQ | 0.40 | 0.60 | — | 0.40 | 0.60 | — |
|  |  |  | DA-BQ | — | — | — | — | — | — |
|  |  |  | DMC | — | — | — | — | — | — |

TABLE 13-continued

|  |  |  |  |  |  |  |  |
|---|---|---|---|---|---|---|---|
|  | Tertiary Amino Monomer | DM | — | — | 4.50 | — | — | 4.50 |
|  |  | DMAPAA | — | — | — | — | — | — |
|  | α, β-Unsaturated Carboxylic Acid | IA | 1.80 | — | — | 1.80 | — | — |
|  |  | AA | — | — | 1.00 | — | — | 1.00 |
|  | Nitrogen-Containing Cross-Linking Monomer | DMAA | — | — | — | — | — | — |
|  |  | MBAM | — | — | 0.05 | — | — | — |
|  | Another Polymerizable Monomer | MMA | — | — | — | 0.50 | — | — |
|  | (Meth)Allyl Sulfonate | SMAS | 1.00 | — | — | 1.00 | — | — |
| Properties | Polymerization Initiator | Kind | | APS | | | APS | |
|  | Aqueous Solution | Solid Content [%] | | 21.2 | | | 20.6 | |
|  |  | pH | | 3.70 | | | 4.20 | |
|  |  | Viscosity [mPa·s] | | 7,300 | | | 6,400 | |
|  | Acrylamide Polymer | Molecular Weight [10000 Da] | | 398 | | | 446 | |
| Evaluation | Remaining AM Amount [ppm/Total Amount of Solid Content] | | | 77 | | | 81 | |
|  | AM Amount per Paper Weight [ppm] | | | 0.07 | | | 0.05 | |
|  | IB [mJ] | | | 231 | | | 224 | |
|  | Retention Rate [%] | | | 70 | | | 69 | |

| | | | No. | | | | | |
|---|---|---|---|---|---|---|---|---|
| | | | Example 8 | | | Example 9 | | |
| Polymerization Component | | | First-A | First-B | Second-C | First-A | First-B | Second-C |
| Ratio in Total Amount of Polymerization Component [mol %] | | | 58.12 | 37.38 | 4.50 | 58.18 | 37.32 | 4.50 |
| Mixing Formulation | Polymerization Component [mol %] | Acrylamide | AM | 54.92 | 36.70 | — | 54.98 | 36.70 | — |
| | | Quaternary Ammonium Monomer | DADMAC | — | — | — | — | — | — |
| | | | DM-BQ | 0.40 | 0.60 | — | 0.40 | 0.60 | — |
| | | | DA-BQ | — | — | — | — | — | — |
| | | | DMC | — | — | — | — | — | — |
| | | Tertiary Amino Monomer | DM | — | 0.08 | 4.50 | — | — | 4.50 |
| | | | DMAPAA | — | — | — | — | — | — |
| | | α, β-Unsaturated Carboxylic Acid | IA | 1.80 | — | — | 1.80 | — | — |
| | | | AA | — | — | — | — | — | — |
| | | Nitrogen-Containing Cross-Linking Monomer | DMAA | — | — | — | — | 0.02 | — |
| | | | MBAM | — | — | — | — | — | — |
| | | Another Polymerizable Monomer | MMA | — | — | — | — | — | — |
| | | (Meth)Allyl Sulfonate | SMAS | 1.00 | — | — | 1.00 | — | — |
| Properties | Polymerization Initiator | Kind | | APS | | | APS | |
| | Aqueous Solution | Solid Content [%] | | 20.5 | | | 20.8 | |
| | | pH | | 4.00 | | | 4.00 | |
| | | Viscosity [mPa·s] | | 7,800 | | | 9,500 | |
| | Acrylamide Polymer | Molecular Weight [10000 Da] | | 402 | | | 481 | |
| Evaluation | Remaining AM Amount [ppm/Total Amount of Solid Content] | | | 93 | | | 98 | |
| | AM Amount per Paper Weight [ppm] | | | 0.09 | | | 0.15 | |
| | IB [mJ] | | | 232 | | | 228 | |
| | Retention Rate [%] | | | 71 | | | 71 | |

TABLE 14

| | | | | No. | | | | | |
|---|---|---|---|---|---|---|---|---|---|
| | | | | Example 10 | | Example 11 | | Example 12 | |
| | Polymerization Component | | | First | Second | First | Second | First | Second |
| | Ratio in Total Amount of Polymerization Component [mol %] | | | 94.90 | 5.10 | 96.90 | 3.10 | 92.00 | 8.00 |
| Mixing Formulation | Polymerization Component [mol %] | Acrylamide | AM | 91.90 | — | 91.40 | — | 90.30 | — |
| | | Quaternary Ammonium Monomer | DADMAC | — | — | 3.00 | — | — | — |
| | | | DM-BQ | 0.40 | 0.60 | — | — | — | 1.50 |
| | | | DA-BQ | — | — | — | — | — | 2.00 |
| | | | DMC | — | — | — | — | — | 1.00 |
| | | Tertiary Amino Monomer | DM | — | 4.50 | — | 2.50 | — | 1.00 |
| | | | DMAPAA | — | — | — | — | — | — |
| | | α, β-Unsaturated Carboxylic Acid | IA | 1.80 | — | 1.50 | — | 0.60 | 0.20 |
| | | | AA | — | — | — | 0.60 | — | 2.00 |
| | | Nitrogen-Containing | DMAA | — | — | — | — | — | 0.30 |
| | | Cross-Linking Monomer | MBAM | — | — | — | — | — | — |
| | | Another Polymerizable Monomer | MMA | — | — | — | — | — | — |
| | | (Meth)Allyl Sulfonate | SMAS | 0.80 | — | 1.00 | — | 1.10 | — |
| | Polymerization Initiator | Kind | | APS | | APS | | APS | |
| Properties | Aqueous Solution | Solid Content [%] | | 21.1 | | 20.9 | | 20.8 | |
| | | pH | | 4.10 | | 3.90 | | 3.80 | |
| | | Viscosity [mPa·s] | | 5,600 | | 6,100 | | 9,300 | |
| | Acrylamide Polymer | Molecular Weight [10000 Da] | | 332 | | 350 | | 410 | |
| | Remaining AM Amount [ppm/Total Amount of Solid Content] | | | 80 | | 73 | | 69 | |
| Evaluation | AM Amount per Paper Weight [ppm] | | | 0.04 | | 0.04 | | 0.06 | |
| | IB [mJ] | | | 234 | | 234 | | 231 | |
| | Retention Rate [%] | | | 73 | | 72 | | 71 | |

| | | | | No. | | | | | |
|---|---|---|---|---|---|---|---|---|---|
| | | | | Example 13 | | | Example | | |
| | Polymerization Component | | | First-A | First-B | Second-C | First-A | First-B | Second-C |
| | Ratio in Total Amount of Polymerization Component [mol %] | | | 73.31 | 22.15 | 4.54 | 58.20 | 37.30 | 4.50 |
| Mixing Formulation | Polymerization Component [mol %] | Acrylamide | AM | 70.11 | 21.55 | 0.04 | 56.80 | 36.70 | — |
| | | Quaternary Ammonium Monomer | DADMAC | — | — | — | — | — | — |
| | | | DM-BQ | 0.40 | 0.60 | — | 0.40 | 0.60 | — |
| | | | DA-BQ | — | — | — | — | — | — |
| | | | DMC | — | — | — | — | — | — |
| | | Tertiary Amino Monomer | DM | — | — | 4.45 | — | — | 4.50 |
| | | | DMAPAA | — | — | — | — | — | — |
| | | α, β-Unsaturated Carboxylic Acid | IA | 1.80 | — | — | — | — | — |
| | | | AA | — | — | — | — | — | — |
| | | Nitrogen-Containing | DMAA | — | — | 0.05 | — | — | — |
| | | Cross-Linking Monomer | MBAM | — | — | — | — | — | — |
| | | Another Polymerizable Monomer | MMA | — | — | — | — | — | — |
| | | (Meth)Allyl Sulfonate | SMAS | 1.00 | — | — | 1.00 | — | — |
| | Polymerization Initiator | Kind | | APS | | | APS | | |

TABLE 14-continued

| Properties | Aqueous Solution | Solid Content [%] | 20.8 | 21.9 |
|---|---|---|---|---|
| | | pH | 4.00 | 4.10 |
| | | Viscosity [mPa·s] | 6,000 | 6,000 |
| | Acrylamide Polymer | Molecular Weight [10000 Da] | 354 | 321 |
| | Remaining AM Amount [ppm/Total Amount of Solid Content] | | 75 | 75 |
| Evaluation | AM Amount per Paper Weight [ppm] | | 0.20 | 0.03 |
| | IB [mJ] | | 235 | 212 |
| | Retention Rate [%] | | 72 | 62 |

TABLE 15

| | | | | No. | | | | | |
|---|---|---|---|---|---|---|---|---|---|
| | | | | Example 15 | | | Example 16 | | |
| | Polymerization Component | | | First-A | First-B | Sec-ond-C | First-A | First-B | Sec-ond-C |
| | Ratio in Total Amount of Polymerization Component [mol %] | | | 34.60 | 36.20 | 29.20 | 34.60 | 36.30 | 29.10 |
| Mixing Formulation | Polymerization Component [mol %] | Acrylamide | AM | 30.00 | 34.10 | 0.20 | 30.00 | 34.20 | 0.10 |
| | | Quaternary Ammonium Monomer | DADMAC | — | — | — | — | — | — |
| | | | DM-BQ | — | — | — | — | — | — |
| | | | DA-BQ | — | — | 5.00 | — | — | 5.00 |
| | | | DMC | — | — | — | — | — | — |
| | | Tertiary Amino Monomer | DM | — | — | 20.00 | — | — | 20.00 |
| | | | DMAPAA | — | — | — | — | — | — |
| | | α,β-Unsaturated Carboxylic Acid | IA | 4.00 | 2.00 | 4.00 | 4.00 | 2.00 | 4.00 |
| | | | AA | — | — | — | — | — | — |
| | | Nitrogen-Containing | DMAA | — | — | — | — | — | — |
| | | Cross-Linking Monomer | MBAM | — | — | — | — | — | — |
| | | Another Polymerizable Monomer | MMA | — | — | — | — | — | — |
| | | (Meth)Allyl Sulfonate | SMAS | 0.60 | 0.10 | — | 0.60 | 0.10 | — |
| | Polymerization Initiator | Kind | | APS | | | APS | | |
| Properties | Aqueous Solution | Solid Content [%] | | 20.4 | | | 20.7 | | |
| | | pH | | 3.70 | | | 3.70 | | |
| | | Viscosity [mPa·s] | | 4,700 | | | 4,500 | | |
| | Acrylamide Polymer | Molecular Weight [10000 Da] | | 319 | | | 308 | | |
| | Remaining AM Amount [ppm/Total Amount of Solid Content] | | | 90 | | | 81 | | |
| Evaluation | AM Amount per Paper Weight [ppm] | | | 0.09 | | | 0.05 | | |
| | IB [mJ] | | | 210 | | | 217 | | |
| | Retention Rate [%] | | | 71 | | | 70 | | |

| | | | | No. | | | | | |
|---|---|---|---|---|---|---|---|---|---|
| | | | | Example 17 | | | Example 18 | | |
| | Polymerization Component | | | First-A | First-B | Sec-ond-C | First-A | First-B | Sec-ond-C |
| | Ratio in Total Amount of Polymerization Component [mol %] | | | 48.69 | 50.30 | 1.01 | 47.69 | 50.30 | 2.01 |
| Mixing Formulation | Polymerization Component [mol %] | Acrylamide | AM | — | 50.00 | 0.01 | — | 50.00 | 0.01 |
| | | Quaternary Ammonium Monomer | DADMAC | 48.59 | — | — | 47.59 | — | — |
| | | | DM-BQ | — | — | — | — | — | — |
| | | | DA-BQ | — | — | — | — | — | — |
| | | | DMC | — | — | — | — | — | — |

TABLE 15-continued

|  |  |  |  |  |  |  |  |  |
|---|---|---|---|---|---|---|---|---|
|  | Tertiary Amino Monomer | DM | — | — | 1.00 | — | — | 2.00 |
|  |  | DMAPAA | — | — | — | — | — | — |
|  | α,β-Unsaturated Carboxylic Acid | IA | — | — | — | — | — | — |
|  |  | AA | — | — | — | — | — | — |
|  | Nitrogen-Containing | DMAA | — | — | — | — | — | — |
|  | Cross-Linking Monomer | MBAM | — | — | — | — | — | — |
|  | Another Polymerizable Monomer | MMA | — | — | — | — | — | — |
|  | (Meth)Allyl Sulfonate | SMAS | 0.10 | 0.30 | — | 0.10 | 0.30 | — |
|  | Polymerization Initiator | Kind |  | APS |  |  | APS |  |
| Properties | Aqueous Solution | Solid Content [%] |  | 21.4 |  |  | 21.2 |  |
|  |  | pH |  | 4.20 |  |  | 4.30 |  |
|  |  | Viscosity [mPa·s] |  | 1,200 |  |  | 1,400 |  |
|  | Acrylamide Polymer | Molecular Weight [10000 Da] |  | 147 |  |  | 153 |  |
|  | Remaining AM Amount [ppm/Total Amount of Solid Content] |  |  | 87 |  |  | 78 |  |
| Evaluation | AM Amount per Paper Weight [ppm] |  |  | 0.07 |  |  | 0.05 |  |
|  | IB [mJ] |  |  | 206 |  |  | 209 |  |
|  | Retention Rate [%] |  |  | 79 |  |  | 80 |  |

TABLE 16

| | | | No. | | | | | | |
|---|---|---|---|---|---|---|---|---|---|
| | | | Comparative Example 1 | Comparative Example 2 | | | Comparative Example 3 | | |
| | | | | First-A + | | | | | |
| | | | Second-C | First-A | First-B | Second-C | First-B | First-A | First-B | Second-C |
| | Polymerization Component | | | | | | | | | |
| | Ratio in Total Amount of Polymerization Component [mol %] | | 4.50 | 58.20 | 37.30 | 62.70 | 37.30 | 58.10 | 37.40 | 4.50 |
| Mixing Formulation [mol %] | Polymerization Component | Acrylamide | AM | — | 55.00 | 36.70 | 55.00 | 36.70 | 54.90 | 36.70 | — |
| | | Quaternary Ammonium Monomer | DADMAC | — | — | — | — | — | — | — | — |
| | | | DM-BQ | — | 0.40 | 0.60 | 0.40 | 0.60 | 0.40 | 0.60 | — |
| | | | DA-BQ | — | — | — | — | — | — | — | — |
| | | | DMC | — | — | — | — | — | — | — | — |
| | | Tertiary Amino Monomer | DM | 4.50 | — | — | 4.50 | — | — | 0.10 | 4.50 |
| | | | DMAPAA | — | — | — | — | — | — | — | — |
| | | α,β-Unsaturated Carboxylic Acid | IA | — | 1.80 | — | 1.80 | — | 1.80 | — | — |
| | | | AA | — | — | — | — | — | — | — | — |
| | | Nitrogen-Containing | DMAA | — | — | — | — | — | — | — | — |
| | | Cross-Linking Monomer | MBAM | — | — | — | — | — | — | — | — |
| | | Another Polymerizable Monomer | MMA | — | — | — | — | — | — | — | — |
| | | (Meth)Allyl Sulfonate | SMAS | — | 1.00 | — | 1.00 | — | 1.00 | — | — |
| | Polymerization Initiator | Kind | | APS | | | APS | | APS | |

TABLE 16-continued

| Properties | Aqueous Solution | Solid Content [%] | 22.0 | 22.0 | 20.5 |
|---|---|---|---|---|---|
| | | pH | 3.90 | 4.10 | 4.00 |
| | | Viscosity [mPa · s] | 6,100 | 6,100 | 6,000 |
| | Acrylamide Polymer | Molecular Weight [10000 Da] | 351 | 329 | 354 |
| | Remaining AM Amount [ppm/Total Amount of Solid Content] | | 74 | 79 | 75 |
| Evaluation | AM Amount per Paper Weight [ppm] | | 10.9 | 1.63 | 0.34 |
| | IB [mJ] | | 236 | 232 | 240 |
| | Retention Rate [%] | | 73 | 72 | 74 |

| | | | | No. Comparative Example 4 | | |
|---|---|---|---|---|---|---|
| | | | Polymerization Component | First-A | First-B | Second-C |
| | | Ratio in Total Amount of Polymerization Component [mol %] | | 73.15 | 22.15 | 4.70 |
| Mixing Formulation | Polymerization Component [mol %] | Acrylamide | AM | 69.95 | 21.55 | 0.20 |
| | | Quaternary Ammonium Monomer | DADMAC | — | — | — |
| | | | DM-BQ | 0.40 | 0.60 | — |
| | | | DA-BQ | — | — | — |
| | | | DMC | — | — | — |
| | | Tertiary Amino Monomer | DM | — | — | 4.45 |
| | | | DMAPAA | — | — | — |
| | | α, β-Unsaturated Carboxylic Acid | IA | 1.80 | — | — |
| | | | AA | — | — | — |
| | | Nitrogen-Containing | DMAA | — | — | 0.05 |
| | | Cross-Linking Monomer | MBAM | — | — | — |
| | | Another Polymerizable Monomer | MMA | — | — | — |
| | | (Meth)Allyl Sulfonate | SMAS | 1.00 | — | — |
| | Polymerization Initiator | Kind | | | APS | |
| Properties | Aqueous Solution | Solid Content [%] | | | 20.8 | |
| | | pH | | | 4.00 | |
| | | Viscosity [mPa · s] | | | 6,000 | |
| | Acrylamide Polymer | Molecular Weight [10000 Da] | | | 354 | |
| | Remaining AM Amount [ppm/Total Amount of Solid Content] | | | | 75 | |
| Evaluation | AM Amount per Paper Weight [ppm] | | | | 0.98 | |
| | IB [mJ] | | | | 235 | |
| | Retention Rate [%] | | | | 73 | |

The details of abbreviations in Tables are shown below.
((Meth)acrylamide)
AM: acrylamide
(Quaternary Ammonium Monomer)
DADMAC: diallyldimethylammonium chloride
DM-BQ: quaternary salt of dimethylaminoethyl methacrylate by benzyl chloride
DA-BQ: quaternary salt of dimethylaminoethyl acrylate by benzyl chloride
DMC: quaternary salt of dimethylaminoethyl methacrylate by methyl chloride
(Tertiary Amino Monomer)
DM: dimethylaminoethyl methacrylate (tertiary cation)
DMAPAA: dimethylaminopropyl acrylamide (tertiary cation)
(Anionic Polymerizable Monomer)
IA: itaconic acid
AA: acrylic acid
(Nitrogen-Containing Cross-Linking Monomer)
DMAA: N,N'-dimethylacrylamide
MBAM: Methylenebisacrylamide
(Another Polymerizable Monomer)
MMA: methyl methacrylate
((Meth)allyl sulfonate)
SMAS: sodium methallylsulfonate
(Polymerization Initiator)
APS: ammonium persulfate
<Evaluation>
(1) Extraction Test of Acrylamide By using each of the aqueous solution of the (meth)acrylamide polymer obtained in Examples and Comparative Examples, paper was produced by the following method.

That is, a pulp material (bleached kraft pulp (BKP) (hardwood pulp (LBKP)/softwood pulp (NBKP)=50/50, Canadian Standard Freeness (CSF: water filtering property) =380 mL) wad added to a 1 L stainless steel tube so as to obtain 12.5 g in an absolute dry condition and diluted with tap water so that the concentration of the pulp slurry was 3.0 mass %.

Next, the obtained pulp slurry was stirred at 400 rpm, and an aqueous solution of the (meth)acrylamide polymer that was diluted to 1.2 mass % was added thereto one minute after the start of the stirring. The addition amount of the aqueous solution was adjusted so that the solid content thereof was 1.5 mass % with respect to the absolute dry pulp mass.

Two minutes later, the obtained slurry was diluted with tap water (pH of 6.5, total hardness of 135 ppm) so that the concentration of the pulp slurry was 1.0 mass %, and three minutes later, the stirring was terminated, thereby carrying out papermaking and obtaining wet paper (200 g/m$^2$).

Thereafter, the papermaking was carried out again in the same manner as that described above, and the obtained two wet paper were overlapped to be pressed at a temperature of 50° C. Then, the pressed paper was dried at 110° C. for eight minutes with a drum dryer. In this manner, handmade paper (400 g/m$^2$) was obtained.

By using the obtained paper, the amount of the acrylamide contained in the paper was measured by the following method.

That is, first, after the moisture was adjusted overnight in a thermostatic chamber (23° C., 50%), 10 g of the sample paper that was cut into a piece of 1.5 cm×1.5 cm was weighed in a 500 mL round-bottom flask to be refluxed in a 100 mL methanol for four hours. In this manner, an extraction liquid was obtained.

Next, after the extraction liquid was collected, the remaining paper was cleansed twice by a 25 mL methanol. Then, the cleansed liquid was collected to be mixed with the above-described extraction liquid.

Thereafter, while the extraction liquid was heated at 35° C., the methanol was distilled off with an evaporator to obtain an extraction sample. Then, 5 mL of aqueous solution of 0.1 mass % phosphoric acid was added to the dried extraction sample to be dissolved again, and filtered with a 1 μm membrane filter to obtain a measurement sample solution (about 5 mL).

By using the measurement sample solution, the extraction amount of the acrylamide (AM extraction amount) was obtained by the following method.

To be specific, first, 100 mg of acrylamide reagent (>98.0%, manufactured by Tokyo Chemical Industry Co., Ltd.) was weighed with an electronic balance to make up constant 1 L measuring flask volume. By using the measuring flask and a transfer pipet, the obtained solution (acrylamide: 100 mg/L) was adjusted to 10.0 mg/L, 1.0 mg/L, 0.5 mg/L, 0.1 mg/L, and 0.05 mg/L, so that standard samples were obtained.

Next, by using the obtained standard samples, the acrylamide was analyzed with a high performance liquid chromatograph (HPLC) analysis device under the measurement conditions shown below, so that a calibration curve was obtained by an absolute calibration curve method.

Thereafter, by using the measurement sample solution obtained in the description above, the acrylamide was analyzed by using the high performance liquid chromatograph (HPLC) analysis device under the measurement conditions shown below, so that the concentration [mg/L] of the acrylamide was obtained from the calibration curve. From this result, the mass of the acrylamide contained in the measurement sample solution (that is, the mass of the acrylamide extracted from the paper) was obtained by the following formula.

Mass of acrylamide in measurement sample solution [mg]=Concentration of acrylamide measured by HPLC [mg/L]×Fabricated amount of measurement sample solution [5 mL]×(1/1000) [L/mL]

The extraction amount of the acrylamide per mass of the paper (the extraction amount of the acrylamide per mass of the paper) was calculated by the following formula.

Extraction amount of acrylamide per mass of paper [ppm] =Mass of acrylamide in measurement sample solution [mg]/ Mass of paper [10000 mg]×1000000

Device: high performance liquid chromatograph, Chromaster (manufactured by Hitachi High-Technologies Corporation)

Column: LaChrom C18-AQ (5 μm) (manufactured by Hitachi High-Technologies Corporation)

Guard column: LaChrom C18-AQ (5 μm)-G (manufactured by Hitachi High-Technologies Corporation)

Detected wavelength: 220 nm Temperature: 40° C.
Eluent: ultrapure water
Flow rate: 1.00 mL/min
The results are shown in Tables 12 to 16.
(2) Paper Strength By using each of the aqueous solution of the (meth)acrylamide polymer obtained in Examples and Comparative Examples, paper was produced by the following method.

That is, first, a pulp material (bleached kraft pulp (BKP) (hardwood pulp (LBKP)/softwood pulp (NBKP)=50/50, Canadian Standard Freeness (CSF: water filtering property) =380 mL) wad added to a 1 L stainless steel tube so as to obtain 6.25 g in an absolute dry condition and diluted with tap water so that the concentration of the pulp slurry was 3.0 mass %.

Next, the obtained pulp slurry was stirred at 400 rpm, and an aqueous solution of the (meth)acrylamide polymer that was diluted to 1.2 mass % was added thereto one minute after the start of the stirring. The addition amount of the aqueous solution was adjusted so that the solid content thereof was 1.5 mass % with respect to the absolute dry pulp mass.

Two minutes later, the obtained slurry was diluted with tap water (pH of 6.5, total hardness of 135 ppm) so that the concentration of the pulp slurry was 1.0 mass %, and three minutes later, the stirring was terminated, thereby carrying out papermaking and obtaining wet paper (100 g/m$^2$).

Thereafter, the obtained wet paper was pressed at room temperature and then, dried at 110° C. for three minutes with a drum dryer. In this manner, handmade paper (100 g/m$^2$) was obtained.

By using the obtained paper, the paper strength was evaluated by the following method. The results are shown in Tables 12 to 16.

(2-1) Internal Bond [mJ]

In accordance with the standard No. 18-2 "Paper and paperboard-internal bond strength test method-Part 2: Internal Bond Tester method" described in the 2000 edition of JAPAN TAPPI paper and pulp test method, the internal bond (IB) of the paper was measured.

(3) Retention Rate

By using DTP-45 (manufactured by Nakayama Rikagaku Seisakusho), the total amount of the nitrogen in the paper was measured in conformity with a Kjeldahl method, and the retention rate of the (meth)acrylamide polymer papermaking additive in the paper was evaluated. The results are shown in Tables 12 to 16.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The (meth)acrylamide polymer papermaking additive and the producing method thereof of the present invention are preferably used in various packaging paper, among all, in food packaging paper.

The invention claimed is:

1. A method for producing a (meth)acrylamide polymer papermaking additive by polymerizing a polymerization component containing a (meth)acrylamide, a tertiary amino monomer, and a (meth)allyl sulfonate comprising:
   a first polymerization step of obtaining a first polymer by polymerizing a first polymerization component containing the (meth)acrylamide and
   a second polymerization step of obtaining a (meth)acrylamide polymer by polymerizing a second polymerization component containing the tertiary amino monomer under the presence of the first polymer obtained in the first polymerization step, wherein
   the first polymerization component and/or the second polymerization component contain(s) the (meth)allyl sulfonate,
   a ratio of the tertiary amino monomer in the first polymerization component with respect to 100 mol of the (meth)acrylamide in the first polymerization component is 0.1 mol or less, and
   a ratio of the (meth)acrylamide in the second polymerization component with respect to 100 mol of the tertiary amino monomer in the second polymerization component is 1.0 mol or less.

2. The method for producing a (meth)acrylamide polymer papermaking additive according to claim 1, wherein
   the first polymerization component does not contain the tertiary amino monomer.

3. The method for producing a (meth)acrylamide polymer papermaking additive according to claim 1, wherein
   the second polymerization component does not contain the (meth)acrylamide.

4. The method for producing a (meth)acrylamide polymer papermaking additive according to claim 1, wherein
   the first polymerization component and/or the second polymerization component contain(s) a quaternary ammonium monomer.

5. The method for producing a (meth)acrylamide polymer papermaking additive according to claim 1, wherein
   the first polymerization component and/or the second polymerization component contain(s) an anionic polymerizable monomer.

6. The method for producing a (meth)acrylamide polymer papermaking additive according to claim 1, wherein
   the first polymerization component and/or the second polymerization component contain(s) a cross-linking monomer containing nitrogen, and
   a ratio of the cross-linking monomer containing nitrogen in the first polymerization component with respect to 100 mol of the (meth)acrylamide in the first polymerization component is 0.1 mol or less.

7. The method for producing a (meth)acrylamide polymer papermaking additive according to claim 6, wherein
   the second polymerization component contains a cross-linking monomer containing nitrogen.

8. The method for producing a (meth)acrylamide polymer papermaking additive according to claim 1, wherein
   the first polymerization component and/or the second polymerization component further contain(s) another polymerizable monomer.

9. The method for producing a (meth)acrylamide polymer papermaking additive according to claim 1, wherein
   in the first polymerization step and/or the second polymerization step, the polymerization component is subjected to a multi-step polymerization.

10. A (meth)acrylamide polymer papermaking additive obtained by
    polymerizing a polymerization component containing
    a (meth)acrylamide, a tertiary amino monomer, and a (meth)allyl sulfonate and
    obtained by first obtaining a first polymer by polymerizing a first polymerization component containing the (meth)acrylamide and then,
    polymerizing a second polymerization component containing the tertiary amino monomer under the presence of the first polymer, wherein
    the first polymerization component and/or the second polymerization component contain(s) the (meth)allyl sulfonate,
    a ratio of the tertiary amino monomer in the first polymerization component with respect to 100 mol of the (meth)acrylamide in the first polymerization component is 0.1 mol or less, and a ratio of the (meth)acrylamide in the second polymerization component with respect to 100 mol of the tertiary amino monomer in the second polymerization component is 1.0 mol or less.

* * * * *